United States Patent

[11] 3,630,133

[72] Inventor Jun Shimomura
 Tokyo, Japan
[21] Appl. No. 727,865
[22] Filed May 9, 1968
[45] Patented Dec. 28, 1971
[73] Assignee Nippon Kogaku K. K.
 Tokyo, Japan
[32] Priority June 6, 1967
[33] Japan
[31] 42/48022

[54] SINGLE-LENS REFLEX CAMERA HAVING A DEVICE FOR INDICATING ADJUSTED EXPOSURE VALUE IN THE FINDER
9 Claims, 13 Drawing Figs.
[52] U.S. Cl. .................................................. 95/42,
 95/44
[51] Int. Cl. .................................................. G03b 19/12
[50] Field of Search ........................................ 95/42, 44;
 88/1.5

[56] References Cited
UNITED STATES PATENTS
3,393,623 7/1968 Gutmann et al. ............. 95/44
FOREIGN PATENTS
1,099,840 2/1961 Germany ...................... 88/1.5
 46,304 12/1962 Poland ........................... 88/1.5

Primary Examiner—Samuel S. Matthews
Assistant Examiner—Richard L. Moses
Attorney—Anton J. Wille ABSTRACT: A single-lens reflex camera is provided with at least two interchangeable viewfinders wherein exposure factors, such as shutter speed, aperture opening and the like, may be observed along the edges of the viewing screen. With one viewfinder positioned on the mirror box of the camera, an inverse image of the object is observed, and with the other viewfinder in place, an erected image of the object is observed. A viewing screen is provided with exposure indicia so arranged that an erected image of the indicia is observed in both of the viewfinders.

SINGLE-LENS REFLEX CAMERA HAVING A DEVICE FOR INDICATING ADJUSTED EXPOSURE VALUE IN THE FINDER

This invention relates to a single-lens reflex camera having a device for indicating adjusted exposure value in the finder.

There have hitherto been proposed a number of devices for indicating the exposure factors such as the stop value of lens, shutter time and the like within the viewfinder of a single lens reflex camera. However, most of the conventional devices have the finder optical system and focusing screen built in the camera, and are not interchangeable in most cases.

In a single-lens reflex camera provided with interchangeable viewfinders it is necessary to provide the viewing optical system with a pentaprism for erecting the image reflected by the viewing mirror onto the viewing or focusing screen since the objective lens reverses the image of the object. It has been known that in a waist-level viewfinder having a magnifying lens without providing a specific optical system, an inverted image of the object is observed. Consequently, if the scale indicia which consists of numerals and characters is to be observed as an erect image, the viewfinder should be provided with an erecting optical system. If an indicia scale is provided on the viewing screen, the indicia will be observed in its reversed form.

The object of the present invention is to provide a simple indicating method within an interchangeable viewfinder without providing any specific optical system for obtaining an erect image of the scale indicia when a waist-level viewfinder is interchangeably used.

In accordance with the invention, a single-lens reflex camera is provided with interchangeable viewfinders, one being of the eye-level type and the other being of the waist-level type, the viewing screen or plate being preferably provided with exposure data such as shutter speed, aperture opening and the like, along opposite edges, the indicia along one edge being reversed. The viewing screen forms a part of a removable assembly which is insertable into the interchangeable viewfinders in a given direction so that an erect image of the indicia is viewed in the viewfinder positioned on the camera body, an index or pointer movable by the exposure-setting mechanism of the camera cooperating with the indicia scales in which:

Figure 8:
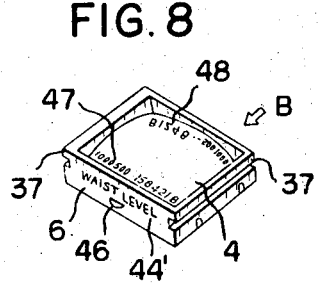
FIG. 8 shows the outlook of another embodiment of the finder screen of this invention.
Figure 10A:
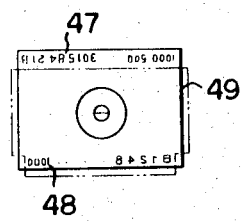
Figure 11A:
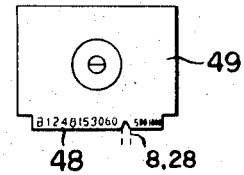
Figure 10B:
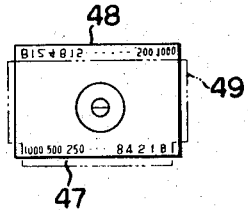
Figure 11B:
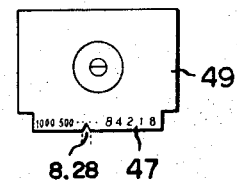

FIGS. 10a, and 10b are diagrams showing the finder screen of FIG. 8 inserted into the mirror box;

FIGS. 11a and 11b are diagrams showing the finder view as the screen of FIG. 10 is observed through the finder eyepiece lens.

Figure 1:
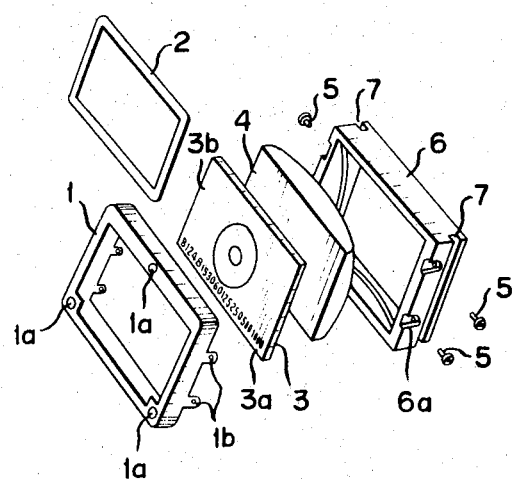
FIG. 1 is a diagram showing the finder screen of this invention.
Figure 2:
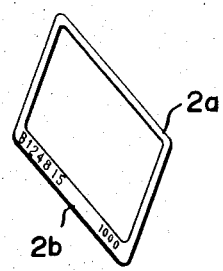
FIG. 2 is another embodiment of the interval adjusting board in FIG. 1.

Referring now to FIG. 1 of the drawings, a viewing screen frame 1 is provided for supporting an adjustable frame 2, a focusing screen 3 and a condenser lens 4 in a viewfinder retainer frame 6. The frame 1 is formed with dependent ears 1b which are received in grooves 6a provided in the frame 6, and is secured thereto by screws 5 to form a focusing screen assembly. Three projections 1a are provided on the frame 1 which abut the base surface 15 of a mirror box 13 on the camera body. The adjustable frame 2 is provided for adjusting the spacing between the surface 3b of the viewing screen and the projections 1b of the frame 1. Focusing surface 3b is provided with indicia 3a, which in this instance is for indicating the shutter speed into the camera. It is also possible to provide similar indicia 2b on the frame 2 as illustrated in FIG. 2. It will be noted that the shutter speed scale is laid out on the screen 3 and on the frame 2 so that it may be read in the normal manner.

The focusing screen assembly is positionable within the upper edges of the mirror box 13, the mirror box being provided with a elongated slot 16 on one side thereof. Slideable secured to the side of the box 10 by screws 17, is an interlocking member 18 having fixed thereto an extending index pointer 8 which passes through the slot 16. The interconnecting member 18 is provided with a rack 18a which meshes with a pinion 20 secured to a shaft carrying a shutter dial 14. A spring 19 secured at one end to the interlocking member and at the other end to the camera body removes any play between the interlocking member and the pinion.

Secured to a sidewall of the mirror box 13 is a leaf spring 11 secured thereto by screws 9. Pins 12 fixed on the leaf spring 11 pass through openings provided in the sidewall of the mirror box 13 and press against the retaining frame 6 of the viewing screen assembly so that the viewing screen is held in place. The scales 3a or 2b are properly positioned and are readable against the pointer 8.

Figure 3:
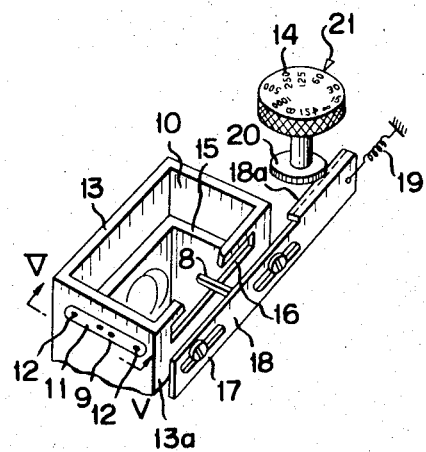
FIG. 3 is a perspective view of an embodiment showing the structure of the mirror box on the camera of this invention.
Figure 5:
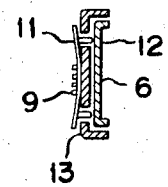
FIG. 5 is a diagram showing the cross-sectional view of the embodiment across V—V line.
Figure 4:
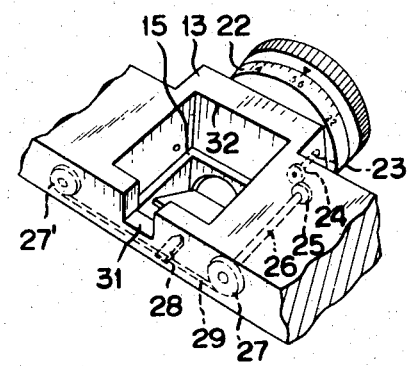
FIG. 4 is a perspective view of another embodiment.

In FIG. 4 an embodiment of the invention is illustrated in which the aperture settings of the objective lens are observable in the viewfinder. In this instance, a stop adjustment ring 22 of the objective is coupled through a shaft 23, gears 24 and 25, shaft 26 to a pulley 27. A second pulley 27' spaced from the first pulley is provided with spring barrel (not shown) in which the spring tends to rotate the pulley 17' in a clockwise direction. A flexible cable or wire 29 is wound around the pulleys and carries a pointer 28 which projects through the slot in the mirror box in the manner described in connection with FIG. 3.

Thus when the viewfinder screen assembly described is positioned in the mirror box 13, with the interchangeable units as illustrated in FIGS. 6 to 9, the scale indicia provided on the viewing screen (or frame) can be read against the index pointer 8 or 28 as the index pointer is moved by the shutter speed know or the aperture stop ring of the camera respectively.

Figure 6:
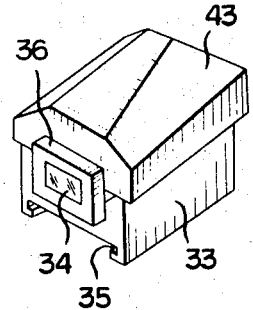
FIG. 6 is an outlook of the eye-level finder of this invention.
Figure 9:
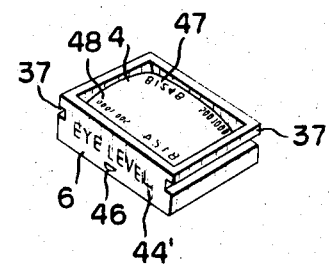
FIG. 9 is the outlook of FIG. 8 observed from the direction shown by an arrow.

Referring now to FIG. 6, an eye-level viewfinder is illustrated wherein a pentaprism (not shown) is enclosed in a housing 33, the housing being provided with an eyepiece 34 in a lens frame 36. The lens frame 36 forms a projection which fits into a groove 31 of the camera body when the viewfinder is fitted on the camera. The housing 33 is formed at its lower end with facing grooves 35 for receiving a viewing plate assembly as illustrated in FIG. 9. A cover 43 enclosed the pentaprism and eyepiece lens assembly.

Figure 7:
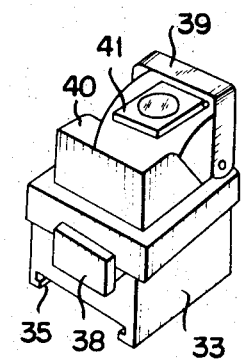
FIG. 7 is the outlook of the waist-level finder of this invention.

In FIG. 7, a waist-level viewfinder is illustrated formed by a housing 33 and a hood 40 having a collapsible cover 39 and a magnifying lens 41. The housing 33 is provided with the facing grooves 35 and a projection 38 on one sidewall. The projection is adapted to register the groove 31 provided in the camera body.

In FIG. 8, and in FIG. 9, a viewing plate assembly is illustrated which is slidably receivable in the grooves 35 formed in the bottom of the housings 33 of the viewfinders illustrated in FIGS. 6 and 7. The frame 6 is formed with longitudinal grooves 37 which are received in the grooves 35 in the housings 33. The frame 6 is appropriately designated on opposite sides as at 44' to indicate the manner in which the assembly is to be inserted into the viewfinder housing, a tab or projection 46 being provided to aid in sliding the assembly in and out of the housing. A special projection or groove may be provided to prevent insertion of the frame 6 in the housing grooves in the wrong direction.

It will be noted that two scales 47 and 48 may be viewed through the condenser lens 4, in one instance the scale being reversed from right to left on the viewing plate and in the other instance the numerals and designations being normally arranged. In FIG. 10a, the dotted line 49 indicates the area of the viewing screen visible when the frame 6 is inserted into the eye-level viewfinder of FIG. 6, and in FIG. 10b, the dotted line indicates the viewing area when the frame 6 is inserted in the waist-level finder of FIG. 7. The visible area enclosed by the dotted line 49 can be restricted by a suitable mask on the bottom of the viewfinder assembly, or it may be determined by the opening in the casing. In FIG. 10a, only scale 48 with the reversed numerals is observable and scale 47 is covered. When viewed through the eyepiece 34, the numerals are erected as illustrated in FIG. 11a by the reversing characteristics of the pentaprism.

In FIG. 10b the scale 47 is visible within the area delineated by line 49, while the scale 48 is covered with the frame 6 inserted properly in the waist-level viewfinder of FIG. 7. Except for the magnifying lens 41 provided on the viewfinder cover 39, no special optical system is required for erecting the indicia image of scale 47.

Thus the one viewing screen assembly as illustrated in FIGS. 8 and 9 is provided for both types of viewfinders, but it is possible to provide a separate viewing screen assembly as illustrated in FIG. 1 for each type of viewfinder. It will be understood, that the indicia 2a, 3a, 47 and 48 may be provided on the shorter side of the viewfinder screen or adjustable plate.

It will be apparent, that it is not necessary to insert the viewing screen assembly into the particular viewfinder to be used, before mounting the viewfinder on the camera. The screen assembly may first be positioned in the mirror box and then the viewfinder mounted over it. Further, the invention as described may be used in conjunction with angle viewers provided for eye-level viewfinders, or combination viewfinders wherein a mirror attachment for a waist-level viewfinder converts the viewfinder to an eye-level viewfinder.

What is claimed is:

1. A single-lens reflex camera having an objective lens, a reflecting mirror and a viewing screen, in which the image formed on the screen by the objective is inverse of the object to be photographed, the improvement comprising at least two types of interchangeable viewfinders, the first viewfinder for observing the image on the screen as an inverse image and the second viewfinder for observing the image on the finder screen as an erect image, the interchangeable viewfinders and the screens being removable from the camera body; an index movable along the periphery of the viewfinder screen; an exposure-adjusting means on said camera and interlocked with said index; a first scale consisting of characters of the erect image provided on the finder screen, and a second scale consisting of characters of the inverse image provided on the finder screen; the index cooperating with the first scale when the first finder is used and the index cooperating with the second scale when the second finder is used.

2. A single-lens reflex camera according to claim 1, wherein said two scales are provided on tow sides of one viewfinder screen, the position of a scale relative to the camera body being dependent upon the positioning of the screen on the camera body.

3. A single-lens reflex camera according to claim 1, wherein the respective viewfinder retains the respective viewfinder screen.

4. A single-lens reflex camera according to claim 3, wherein the position of the respective viewfinder screen relative to the camera body can be changed when the viewfinder screen is mounted on the viewfinder.

5. A single-lens reflex camera according to claim 2, wherein the mounting position of the viewfinder screen relative to the camera body is indicated on the screen.

6. A single-lens reflex camera according to claim 4, wherein the mounting position of the viewfinder screen on the viewfinder is indicated.

7. A single-lens camera according to claim 1, wherein resilient means is provided to bias the mounted viewfinder screen in a longitudinal direction of the scale to hold the screen on the camera body.

8. A single-lens reflex camera according to claim 2, wherein each of the interchangeable viewfinders comprises a body portion for insertion into the mirror box of the camera, opposing longitudinal grooves in the lower part of the body portion, and wherein the viewfinder screen is provided with longitudinal grooves for slidable mounting the screen on the viewfinder body.

9. A single-lens reflex camera according to claim 4, wherein each of the interchangeable viewfinders comprises a body portion for insertion into the mirror box of the camera, opposing longitudinal grooves in the lower part of the body portion, and wherein the viewfinder screen is provided with longitudinal grooves for slidably mounting the screen on the viewfinder body.

* * * * *